Feb. 18, 1964  E. J. DIEBOLD  3,121,835
HIGH VOLTAGE, HIGH POWER RECTIFIER SYSTEM
Filed Sept. 19, 1960

$T = RC$

INVENTOR.
EDWARD J. DIEBOLD
BY
OSTROLENK, FABER, GERB & SOFFEN
ATTORNEYS

United States Patent Office 3,121,835
Patented Feb. 18, 1964

3,121,835
HIGH VOLTAGE, HIGH POWER RECTIFIER SYSTEM
Edward J. Diebold, Palos Verdes Estates, Calif., assignor to International Rectifier Corporation, El Segundo, Calif., a corporation of California
Filed Sept. 19, 1960, Ser. No. 56,900
3 Claims. (Cl. 321—15)

This invention relates to a rectifier system for supplying high power at extremely high voltages and more specifically relates to a novel D.-C. voltage supply for transmitter tubes which require frequent short bursts of power and is comprised of a voltage doubler circuit modified with a high frequency choke.

There are many applications which require very high voltage supplies which can supply very high currents for a short time. Thus, in the field of radar, or for long range application in the field of radio transmitters for tropospheric scatter propagation, new amplifier tubes known as "super power tubes" require a plate voltage of the order of 30,000 to 50,000 volts or higher together with plate currents which may range, for example, between 300 to 500 amperes. Since these tubes normally are employed for frequent short bursts of power, the anode power supply is designed for relatively small currents with the current output during the current surge to the tube being provided by a relatively large capacitor bank.

When the load is a transmitter circuit, the D.-C. power supply must be isolated from the transmitter by a high frequency choke which prevents feedback of radio frequencies of the transmitter to the power supply. This choke is interposed between the rectifier power supply and the large capacitor energy storage bank connected directly to the transmitter load. This same capacitor bank also operates as a very low impedance bypass for the radio frequency signal while still being capable of providing the D.-C. energy for driving the output tube or transmitter circuit. Thus in the prior type of high voltage, high power supply, a large capacitor bank serves two functions; first, it is the energy storage device for the load; and secondly it operates as a low impedance bypass in the load circuit.

When extremely high voltages at relatively high currents are employed in this manner, there are substantial problems in the rectification of available A.-C. power for charging the capacitors. This problem is conventionally solved by providing a very large number of individual rectifier devices in series with one another and the capacitor bank. This, however, is relatively expensive because of the very large number of series connected rectifiers required for achieving these high voltages and high currents. Accordingly, a system which would reduce the required number of rectifier elements is highly desirable.

In accordance with the present invention, it has been found that the relatively large capacitors used for energy storage and for a low bypass impedance element can additionally be caused to operate as a part of a voltage doubler circuit even though a high frequency choke must be interposed between the energy storing capacitor and the A.-C. source for the rectifier. More specifically, the rectifier system is built in the form of a voltage doubler circuit with the high frequency choke contained in the closed circuit including the rectifiers and capacitor.

Where a low frequency A.-C. power supply is provided for charging the capacitors, the high frequency choke will have a negligible impedance at these low frequency values. However, there is still isolation between the rectifier system and the load for high frequency conditions, while the capacitors continue to serve the functions of energy storage and a low bypass element as well as the new and novel function of serving as voltage doubler elements.

Accordingly, a primary object of this invention is to provide a novel high power rectifier system.

Another object of this invention is to provide a high power rectifier system wherein the number of rectifier cells required are reduced.

A further object of this invention is to provide a simplified high voltage, high power rectifier system, wherein a capacitor means is provided for a high frequency load which serves as a D.-C. energy supply for the load, as a low impedance bypass to high frequencies, and as a voltage doubler wherein a high frequency choke is inserted in the doubler circuit to isolate the rectifier supply and the load.

These and other objects of the instant invention shall become readily apparent after reading the following description of the accompanying drawings in which.

Figure 1:
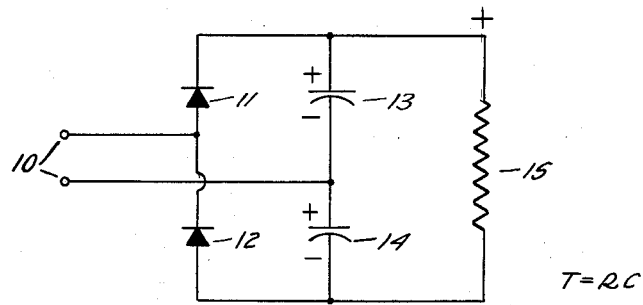
FIGURE 1 shows a typical voltage doubler circuit.

Referring now to FIGURE 1, I have shown a typical well known voltage doubler circuit wherein an A.-C. power source is connected to A.-C. terminals 10. One of the terminals 10 is then connected at the junction of two rectifier elements 11 and 12 which are connected in a closed series arrangement with capacitors 13 and 14. The other terminal 10 of the A.-C. power supply is then connected between the junction of capacitors 13 and 14. Capacitors 13 and 14 are then connected in closed series arrangement with a load such as resistor 15. To properly design this circuit, capacitors 13 and 14 are preferably large enough to have a relatively long time constant which is equal to the product of the capacitance of the capacitors times the resistance of load 15.

If this time constant is longer than the duration of one cycle of the A.-C. power, the capacitors 13 and 14 remain almost fully charged to one-half the output D.-C. voltage as long as the rectifier is in operation. As is well known in the art, capacitors 13 and 14 will charge in the manner shown, whereby the voltage across load 15 will be approximately equal to twice the peak A.-C. voltage at A.-C. terminals 10.

Figure 2:
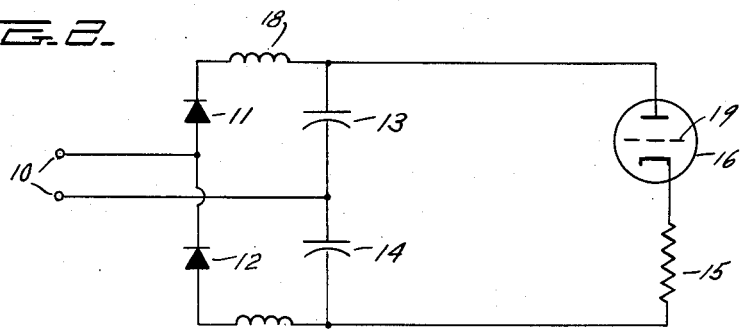
FIGURE 2 shows a voltage doubler circuit modified in accordance with the present invention whereby the circuit serves as a high voltage, high current power supply with the capacitors operating as means for energy storage voltage doubling and as a low frequency bypass for the load.

In accordance with the present invention as is best shown in FIGURE 2 for the case in which a high voltage high power transmitter tube 16 controls the application of power to load 15, I have inserted a first and second high frequency choke 17 and 18 in the closed circuit including rectifiers 11 and 12 and capacitors 13 and 14. In this circuit, capacitors 13 and 14 serve the purpose of energy storage and a low impedance bypass for load 15 and additionally operate in the usual voltage doubler manner.

Since, when tube 16 is fired, a high frequency oscillation is created in the circuit including capacitors 13 and 14, means are required to prevent feedback of this high frequency oscillation to the load supply connected at terminals 10. I have found that the high frequency chokes 17 and 18 connected as shown in FIGURE 2 can serve the purpose of feed-back prevention without affecting the operation of the voltage doubler circuit where the frequency applied at terminals 10 is substantially lower than the frequency caused by the firing of tube 16. Thus, for relatively low power supply frequencies, chokes 17 and 18 will have a negligible impedance and the operation of the circuit will be substantially unaffected.

Figure 3:
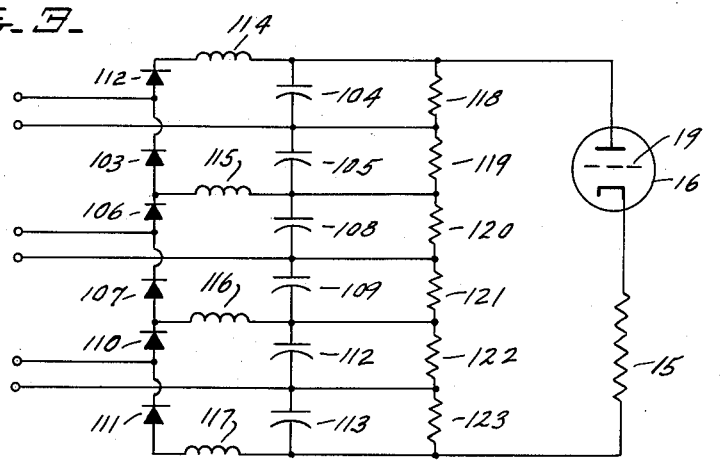
FIGURE 3 shows the novel circuit of FIGURE 2 as modified for a three phase A.-C. power supply for the rectifier system.

While the circuit of FIGURE 2 is for the case of a single phase A.-C. input power supply, FIGURE 3 illustrates the novel supply for the case of a three phase power supply circuit.

In FIGURE 3, the three phase A.-C. source may include a three phase transformer (not shown) having three coils insulated from one another for very high voltage operation and connected across terminals 101, 102 and 103 respectively. The system as shown then becomes three complete voltage doublers wherein the first is comprised of rectifiers 102 and 103 and capacitors 104 and 105. The second voltage doubler system which corresponds to terminals 102 includes rectifiers 106 and 107 and capacitors 108 and 109. The third doubler system which operates in connection with terminals 103 is comprised of rectifiers 110 and 111 and capacitors 112 and 113.

Each of capacitors 104, 105, 108, 109, 112 and 113 are charged to the full peak voltage of their corresponding input A.-C. phase and these voltages are all connected in series with the output schematically illustrated as the output tube 16 and load 15 as illustrated in FIGURE 2.

As in FIGURE 2, high frequency chokes 114 and 115 operate in the voltage doubler associated with phase terminals 101; high frequency chokes 115 and 116 are associated with the voltage doubler system for terminals 102; while high frequency chokes 116 and 117 operate for the voltage doubler system associated with the phase including terminals 103.

A plurality of dividing resistors 118, 119, 120, 121, 122 and 123 are then connected directly across capacitors 104, 105, 108, 109, 112 and 113 respectively as shown.

From the novel circuit of FIGURE 3, it is seen that the voltage rating of the individual rectifiers of the rectifier stacks is limited to that of their respective A.-C. input. The individual capacitors have a voltage which is relatively small compared to the output voltage of the system. The output ripple of the entire system is also extremely smooth because three single phase doublers of an inherently smooth voltage output are connected in series with a phase shift of 60 degrees between them which reduces the total output voltage ripple.

The general advantages of the systems of FIGURES 2 and 3 is that relatively few rectifier stacks are required, each of which has a relatively low voltage rating and, similarly, the capacitor bank is subdivided into several capacitors of lower voltage than the output voltage.

A comparison of the novel voltage supply of FIGURE 3 to the previous typical application of a three phase bridge connected rectifier clearly illustrates the advantages of the present invention. In the present device, each of the rectifier elements will have three times the current capacity of the elements of a three phase bridge system and only 32% as many rectifier stacks are required. Accordingly, there will be a substantial saving in hardware, space, cooling, insulation, voltage dividing resistors and capacitors, etc.

Where the load operates only for very short load pulses such as less than one-third of the cycle in length, the saving is even greater because a full wave rectifier system must be designed for the full pulse capacity in each of its branches.

By providing voltage balancing resistors 118 through 123, the voltage across the capacitors will be accurately divided so that each individual stack will be easier to build. In this regard, it can be shown that the voltage division problem between capacitors increases with the square of the voltage. Furthermore, the resistors in combination with the capacitors reduce the possibility of localized overvoltage on the capacitors and on the rectifier stacks, whereby the mechanical construction of the stacks is substantially simplified.

Although I have described preferred embodiments of this invention, many variations and modifications will now be apparent to those skilled in the art. I prefer, therefore, to be limited, not by the specific disclosure herein, but only by the appended claims.

What is claimed is:

1. A conversion system for transferring power between an A.-C. system and a D.-C. system; said rectifier system including the closed series connection in sequence of a first rectifier, a second rectifier, a first high frequency inductor, a first capacitor, a second capacitor and a second high frequency inductor; said A.-C. system having a first terminal connected between said first and second rectifiers; said A.-C. system having a second terminal connected between said first and second capacitors; said D.-C. system having a first terminal connected between first inductor and said first capacitor; said D.-C. system having a second terminal connected between said second capacitor and said second inductor; said inductors having a low impedance at the frequency of said A.-C. system and a high impedance to high frequencies generated in said D.-C. system to isolate said A.-C. system from high frequency feedback from said D.-C. system.

2. The conversion system substantially as set forth in claim 1 wherein each of said first and second capacitors have respective voltage balancing impedance means connected in parallel therewith; said respective voltage balancing means being connected in series with one another.

3. The device substantially as set forth in claim 2 wherein said respective voltage balancing means include resistors.

References Cited in the file of this patent

UNITED STATES PATENTS

| | | |
|---|---|---|
| 2,470,118 | Trevor | May 17, 1943 |
| 2,552,203 | Morgan | May 8, 1951 |
| 2,597,310 | Fisher | May 20, 1952 |
| 2,621,302 | Friend | Dec. 9, 1952 |
| 2,888,629 | Everhart et al. | May 26, 1959 |

FOREIGN PATENTS

| | | |
|---|---|---|
| 135,119 | Australia | Nov. 7, 1949 |
| 761,886 | Great Britain | Nov. 21, 1956 |
| 1,051,378 | Germany | Feb. 26, 1959 |

OTHER REFERENCES

American Standard Definitions of Electrical Terms, published by the A.I.E.E., August 12, 1941.